(12) United States Patent
Doi et al.

(10) Patent No.: US 6,189,659 B1
(45) Date of Patent: Feb. 20, 2001

(54) DISK BRAKE

(75) Inventors: Kazuhiro Doi; Tadashi Tamasho, both of Kanagawa-ken; Shinji Suzuki, Yamanashi-ken, all of (JP)

(73) Assignees: Tokico Ltd.; Nissan Motor Co., Ltd., both of Kanagawa-Ken (JP)

( * ) Notice: Under 35 U.S.C. 154(b), the term of this patent shall be extended for 0 days.

(21) Appl. No.: 09/168,274

(22) Filed: Oct. 8, 1998

(30) Foreign Application Priority Data

Oct. 8, 1997 (JP) .................................................. 9-291650

(51) Int. Cl.[7] .................................................. F16D 65/38
(52) U.S. Cl. .................................. 188/73.35; 188/73.31; 188/73.37
(58) Field of Search ..................... 188/73.1, 73.2, 188/73.31, 73.35, 73.36, 73.37, 73.39, 73.41, 73.42, 73.43, 73.45, 73.46, 370, 250 E

(56) References Cited

U.S. PATENT DOCUMENTS

| | | | |
|---|---|---|---|
| 4,341,289 | * 7/1982 | Smith | 188/73.39 |
| 4,533,025 | * 8/1985 | Carre | 188/73.39 |
| 4,632,227 | * 12/1986 | Mery et al. | 188/73.1 |
| 4,775,033 | * 10/1988 | Heibel | 188/73.31 |
| 4,775,034 | * 10/1988 | Pachner et al. | 188/73.39 |
| 4,840,255 | * 6/1989 | Murakami et al. | 188/73.35 |
| 5,080,203 | * 1/1992 | Heibel | 188/73.43 |
| 5,236,068 | * 8/1993 | Nagai et al. | 188/250 E |
| 5,279,394 | * 1/1994 | Wollenweber et al. | 188/73.42 |
| 5,320,200 | * 6/1994 | Hashimoto | 188/250 E |
| 5,975,252 | * 11/1999 | Suzuki et al. | 188/73.1 |

FOREIGN PATENT DOCUMENTS 7-217678 * 8/1995 (JP) .
10-078060 * 3/1998 (JP) .

* cited by examiner

*Primary Examiner*—Robert J. Oberleitner
*Assistant Examiner*—Thomas A. Williams
(74) *Attorney, Agent, or Firm*—Wenderoth, Lind & Ponack, L.L.P.

(57) ABSTRACT

A disk brake in which a cylinder bore of a caliper is decentered toward the exit side in the rotational direction of a disk with respect to friction pads, and claw portions of the caliper are also decentered toward the exit side with respect to the friction pads. The entrance-side and exit-side claw portions have approximately the same wall thickness in the circumferential direction of the disk. When the brake is activated, the claw portions exhibit approximately the same rigidity so that the surface pressure of each claw portion pressing the outer friction pad can is kept uniform, and non-uniform.

12 Claims, 4 Drawing Sheets

DISK BRAKE

BACKGROUND OF THE INVENTION

The present invention relates to a disk brake suitably used to apply braking force to a vehicle, for example.

A generally known disk brake includes a caliper having a bridge portion extending over the outer periphery of a disk. A cylinder bore is formed at one side of the bridge portion. An outer leg portion is formed at the other side of the bridge portion. The outer leg portion has at least a pair of claw portions. The disk brake further includes inner and outer friction pads extending in the circumferential direction of the disk at respective positions on both sides of the disk. The friction pads are adapted to be pressed against both sides of the disk by the caliper.

In this type of disk brake, when the brake is activated, a piston provided in the cylinder bore of the caliper is caused to slide toward the disk by a fluid pressure supplied externally so as to press the friction pads against both sides of the disk in cooperation with the claw portions of the outer leg portion, thereby applying braking force to the disk.

When the vehicle is braked by the disk brake, braking torque from the disk that is transmitted through the friction pads undesirably acts as a bending moment on the caliper. Accordingly, the inner friction pad has such a tendency that the surface pressure applied to the disk is relatively high at the entrance side in the rotational direction of the disk and relatively low at the exit side. Consequently, the inner friction pad is likely to wear non-uniformly at the entrance side.

Therefore, according to the conventional technique, the cylinder bore is decentered (i.e., the center axis is shifted) toward the exit side in the rotational direction of the disk with respect to the friction pads. Consequently, the surface pressure of the inner friction pad applied to the disk is reduced at the entrance side, and thus non-uniform wear of the friction pad is suppressed.

Incidentally, the disk brake according to the above-described conventional technique is arranged such that, among the cylinder bore, the bridge portion and the outer leg portion that constitute the caliper, the cylinder bore is decentered toward the exit side in the rotational direction of the disk with respect to the longitudinal center position of the friction pads.

However, the claw portions of the outer leg portion are formed such that the space therebetween is defined as a recess for machining the cylinder bore. Therefore, the recess is usually decentered toward the exit side in the rotational direction of the disk with respect to the friction pads in accordance with the amount that the cylinder bore has been decentered (i.e., decentration of the cylinder bore). As a result of decentering the recess of the outer leg portion toward the exit side in the rotational direction of the disk, the entrance-side claw portion as viewed in the rotational direction of the disk has a large wall thickness in the circumferential direction of the disk in comparison to the exit-side claw portion.

Consequently, when the brake is activated, there is a difference in rigidity between the claw portions. The rigidity difference may cause the claw portions pressing the outer friction pad in particular to differ in the surface pressure from each other. In such a case, the friction pad is worn non-uniformly, and it becomes likely that brake noise, judder and so forth will occur owing to the non-uniform wear of the friction pad.

SUMMARY OF THE INVENTION

In view of the above-described problems associated with the conventional technique, an object of the present invention is to provide a disk brake designed so that even when the cylinder bore is decentered toward the exit side in the rotational direction of the disk with respect to the friction pads, the outer leg portion, which is integral with the bridge portion, has substantially the same rigidity at the entrance and exit sides in the rotational direction of the disk. Thus, it is possible to suppress non-uniform wear of the friction pad when the brakes are applied and to effectively prevent the generation of brake noise or the like.

To solve the above-described problem, the present invention is applied to a disk brake including a caliper having a bridge portion extending over the outer periphery of a disk. A cylinder bore is formed at one side of the bridge portion. An outer leg portion is formed at the other side of the bridge portion. The outer leg portion has at least a pair of claw portions. The disk brake further includes inner and outer friction pads extending in the circumferential direction of the disk at respective positions on both sides of the disk. The friction pads are adapted to be pressed against both sides of the disk by the caliper. The cylinder bore is decentered toward the exit side in the rotational direction of the disk with respect to the friction pads.

According to the present invention, the outer leg portion of the caliper is decentered toward the exit side in the rotational direction of the disk with respect to the friction pads. An entrance-side and exit-side claw portion of the outer leg portion (as viewed in the rotational direction of the disk) have approximately the same wall thickness in the circumferential direction of the disk.

By virtue of the above-described arrangement, each claw portion can be decentered toward the exit side in the rotational direction of the disk with respect to the friction pads by an amount corresponding to the amount of decentration of the cylinder bore. Thus, when the brake is activated, the outer friction pad can be pressed by the claw portions at positions corresponding to the cylinder bore. Furthermore, because the wall thicknesses of the claw portions in the circumferential direction of the disk are approximately equal to each other, the rigidities of the claw portions can be made substantially equal to each other, and the surface pressures of the claw portions pressing the outer friction pad can be made equal to each other.

According to one embodiment of the present invention, the bridge portion of the caliper is decentered toward the exit side in the rotational direction of the disk with respect to the friction pads.

Consequently, the bridge portion can be decentered toward the exit side in the rotational direction of the disk by an amount corresponding to the amount of decentration of the cylinder bore. Accordingly, when the brake is activated, the rigidities of the bridge portion at the entrance and exit sides in the rotational direction of the disk can be made substantially equal to each other.

According to another embodiment of the present invention, at least one of the friction pads has a first and second shim plate provided between the caliper and the back of the friction pad. The first shim plate is placed in contact with the back of the friction pad in such a manner that displacement of the first shim plate relative to the friction pad is limited. The second shim plate is placed in contact with the caliper at one side thereof and in contact with the first shim plate at the other side thereof. The contact surface of the second shim plate that is in contact with the first shim plate has a smaller coefficient of friction than that of the contact surface of the second shim plate that is in contact with the caliper so that the second shim plate is slidable relative to the first shim plate in the circumferential direction of the disk.

Consequently, the second shim plate is more readily slidable relative to the first shim plate than to the caliper. Therefore, when the first shim plate is displaced in the circumferential direction of the disk, together with the friction pad as one unit, during a braking operation, the first shim plate slides relative to the second shim plate in a state where the second shim plate maintains a predetermined contact position with respect to the caliper. The mutual sliding motion of the two shim plates makes it possible to reduce rotational force transmitted from the disk to the caliper.

DETAILED DESCRIPTION OF THE INVENTION

An embodiment of the present invention will be described below in detail with reference to the accompanying drawings.

FIGS. 1 to 4 show a disk brake according to an embodiment of the present invention as applied to an automobile.

Figure 1:
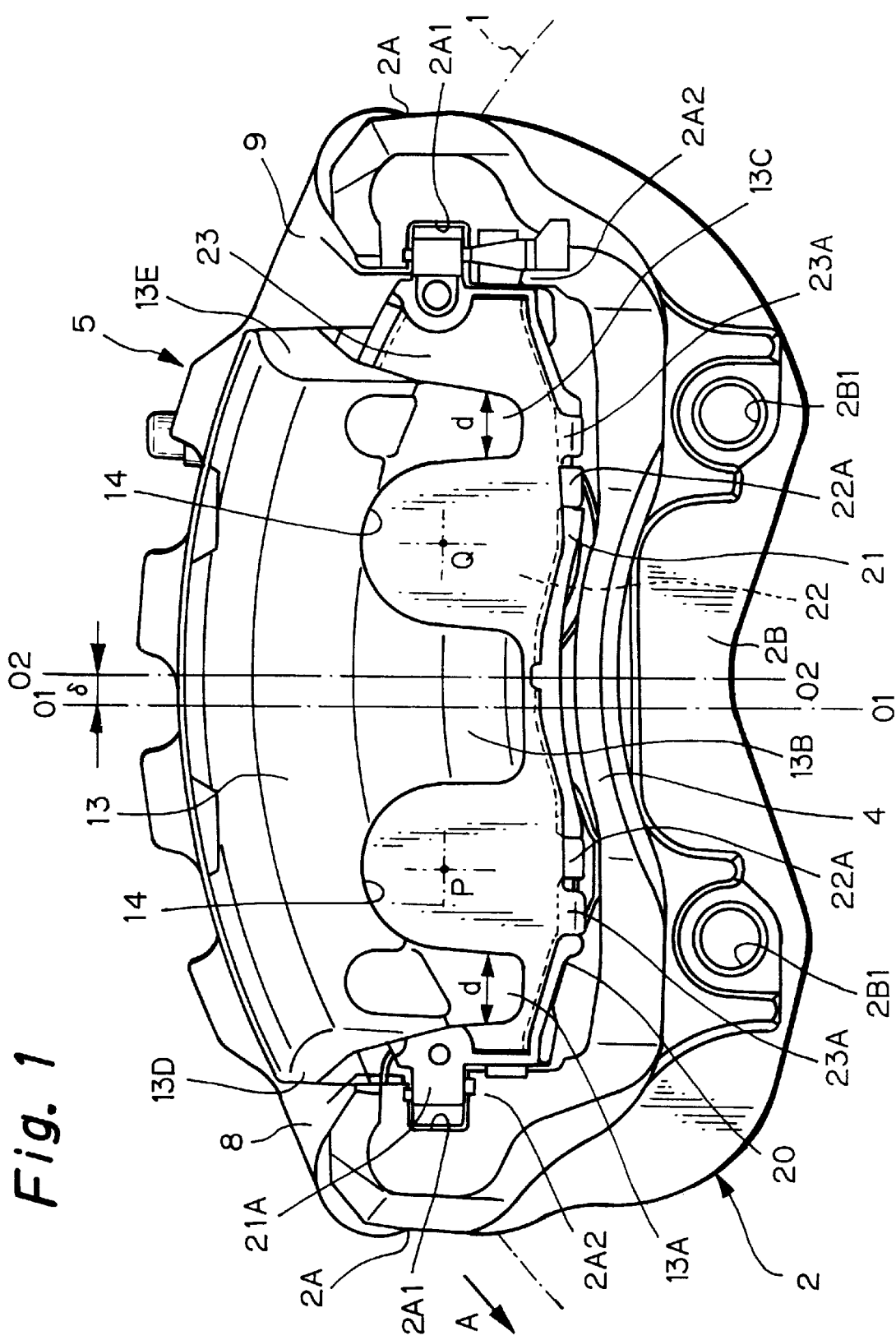
FIG. 1 is a front view showing a disk brake according to an embodiment of the present invention.

In the figures, a disk 1 rotates in the direction of the arrow A in FIG. 1, together with a wheel of an automobile. A mounting member 2 is provided at the inner side of the disk 1. As shown in FIG. 1, the mounting member 2 includes a pair of arm portions 2A and a connecting portion 2B, which are integrally formed. The arm portions 2A are spaced apart from each other in the circumferential direction of the disk 1 and axially extend over the outer periphery of the disk 1. The connecting portion 2B connects together the proximal ends of the arm portions 2A. The mounting member 2 is integrally mounted on a knuckle portion (not shown) as a non-rotating portion of the automobile through a pair of screw holes 2B1 provided in the connecting portion 2B.

Figure 4:
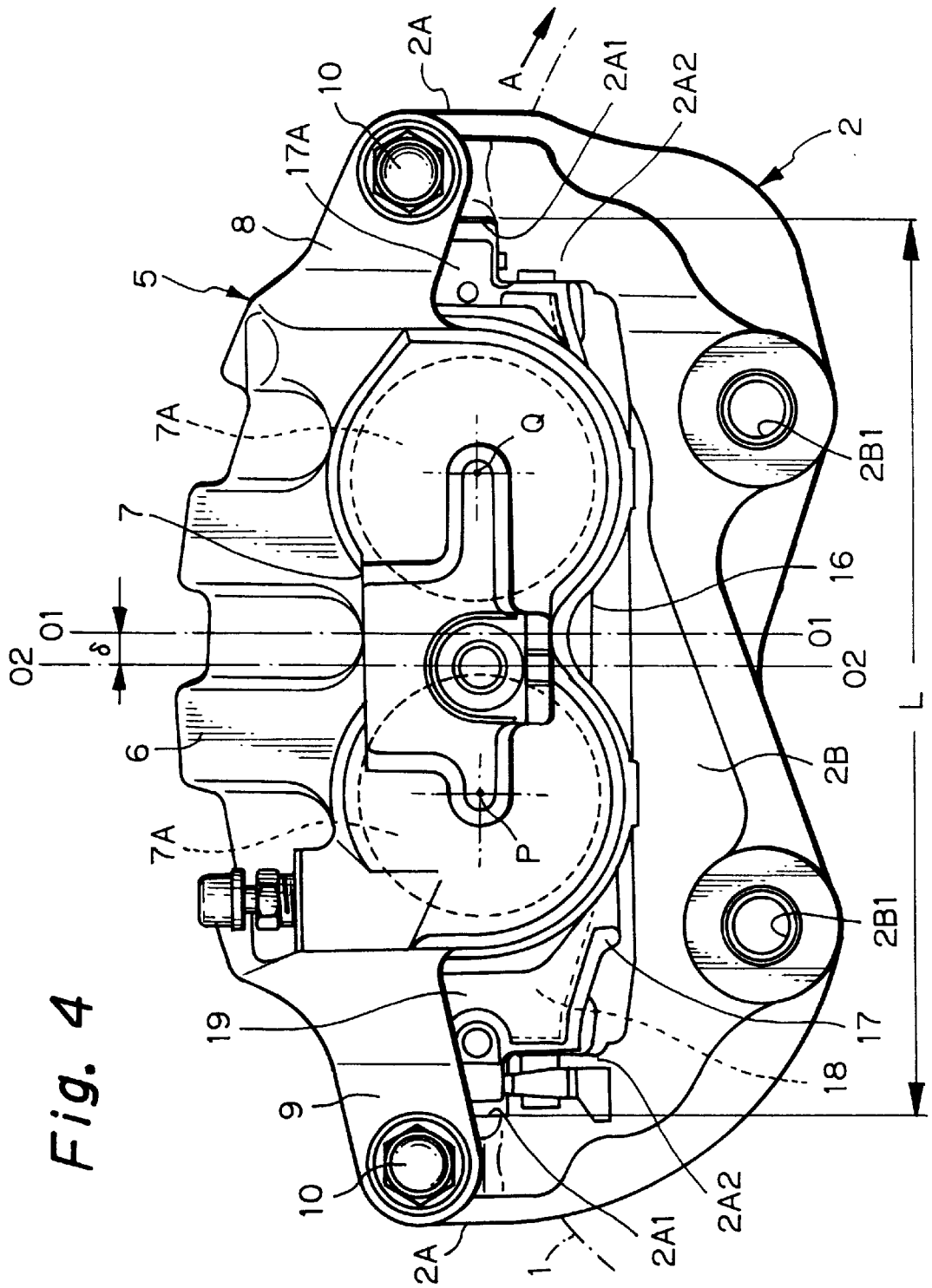
FIG. 4 is a rear view of the disk brake shown in FIG. 1.

Each arm portion 2A has approximately U-shaped pad guide portions 2A1 formed at its proximal (inner) and distal (outer) ends, respectively. Each arm portion 2A further has torque-receiving portions 2A2 formed at its inner and outer ends, respectively. The torque receiving portions 2A2 project inward in the circumferential direction of the disk 1. The distance between the pad guide portions 2A1 is L, as shown in FIG. 4. Lug portions 17A and 21A of friction pads 16 and 20 (described later) are slidably engaged in the pad guide portions 2A1 of each arm portion 2A. Thus, the friction pads 16 and 20 are guided by the respective pad guide portions 2A1 in such a manner as to be slidable in the axial direction of the disk 1. In addition, torque from the disk 1 that is transmitted through the friction pads 16 and 20 is borne by the torque receiving portions 2A2.

The arm portions 2A have respective fitting holes 3 for sliding pins 11 and 12 (described later). The fitting holes 3 extend in the axial direction of the disk 1. As shown in FIG. 1, a bow-shaped narrow reinforcing beam 4 extends between the arm portions 2A to integrally connect the distal ends thereof.

A caliper 5 is slidably supported by the mounting member 2. As shown in FIG. 1 to 4, the caliper 5 comprises a bridge portion 6 extending over the outer periphery of the disk 1 between the arm portions 2A of the mounting member 2; an inner leg portion 7 integrally formed at one side of the bridge portion 6 on the inner side of the disk 1; and an outer leg portion 13 (described later) integrally provided at the other side of the bridge portion 6. A pair of cylinder bores 7A are formed in the inner peripheral wall of the inner leg portion 7. The cylinder bores 7A are spaced apart from each other in the circumferential direction of the disk 1.

Figure 2:
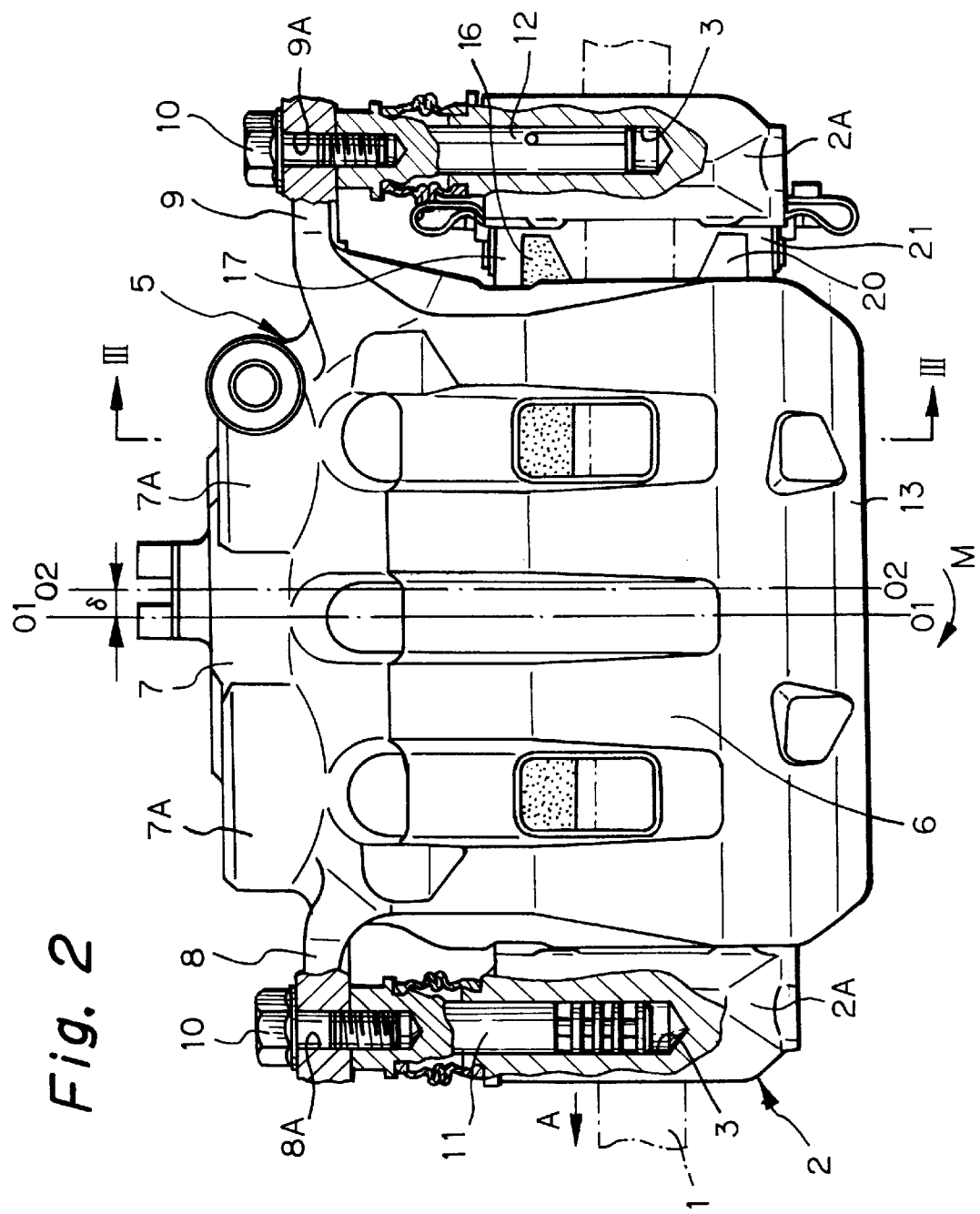
FIG. 2 is a partly-cutaway plan view of the disk brake shown in FIG. 1.

The inner leg portion 7 has a pair of mounting portions 8 and 9 projecting respectively from the left and right sides thereof (as viewed in FIG. 2). The mounting portions 8 and 9 extend in the circumferential direction of the disk 1. Pin bolt holes 8A and 9A are provided in the respective projecting ends of the mounting portions 8 and 9. The sliding pins 11 and 12 are secured to the pin bolt holes 8A and 9A by using pin bolts 10, respectively. The sliding pins 11 and 12 are fitted into the respective fitting holes 3 of the mounting member 2. Thus, the caliper 5 is mounted on the arm portions 2A so as to be slidable in the axial direction of the disk 1.

As shown in FIGS. 1 and 2, the caliper 5 has a center line O1—O1 at the midpoint position between the cylinder bores 7A. The bridge portion 6 is substantially in bilateral symmetry with respect to the center line O1—O1. The mounting portions 8 and 9 differ in length from each other. More specifically, the extent to which the mounting portion 9 projects from the inner leg portion 7 is longer than that of the mounting portion 8 by a predetermined length.

The bridge portion 6, together with the cylinder bores 7A, is decentered such that the center line O1—O1 is displaced relative to a center line O2—O2, which is located at the longitudinal center positions of the friction pads 16 and 20, that is, the midpoint position between the pad guide portions 2A1 (i.e. the arm portions 2A), by a predetermined dimension δ toward the exit side of the disk brake with respect to the rotational direction (indicated by the arrow A) of the disk 1.

Figure 3:
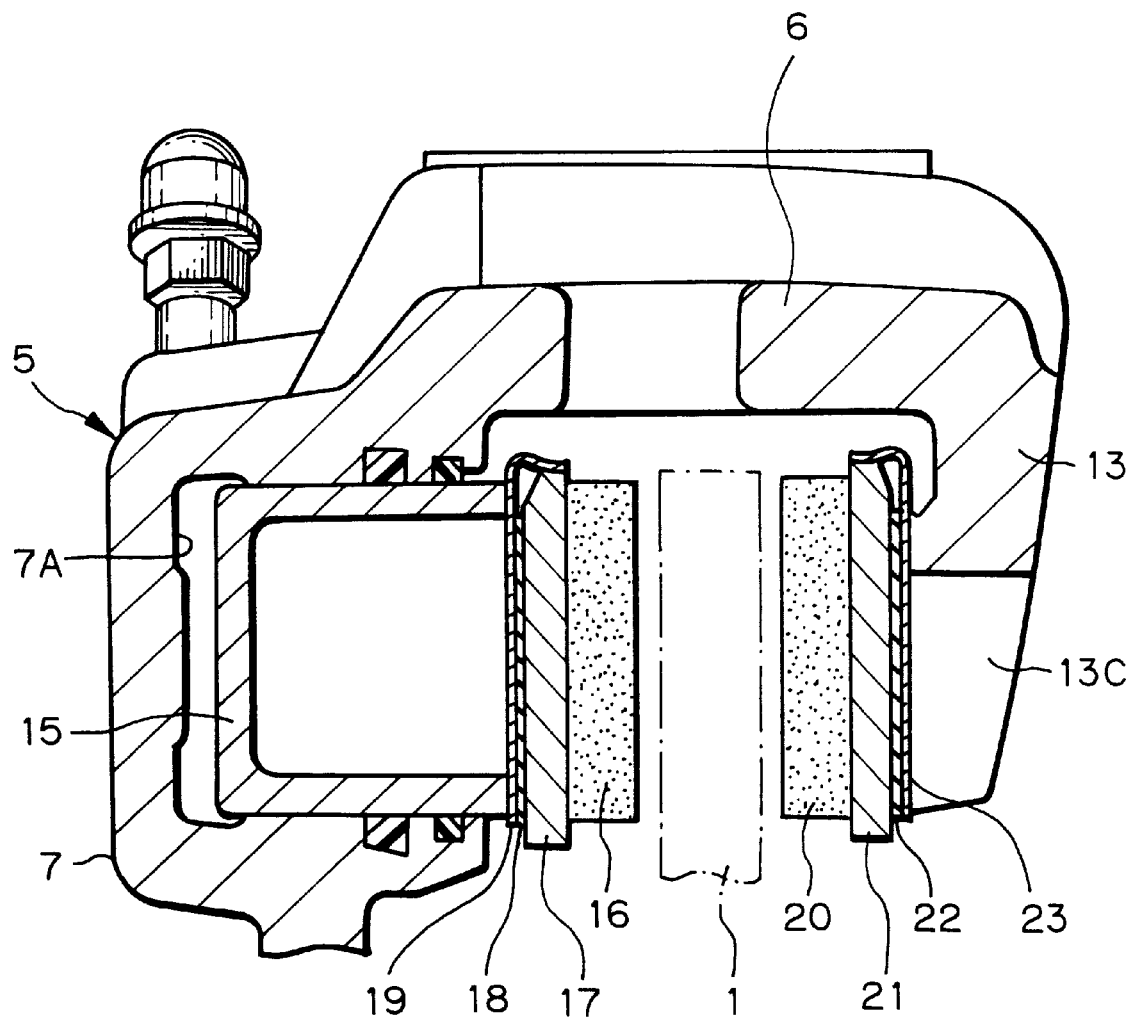
FIG. 3 is a sectional view as seen from the direction of the arrow III-III in FIG. 2.

The outer leg portion 13 is integrally formed with the bridge portion 6 of the caliper 5 at the outer side of the disk 1. As shown in FIGS. 1 and 3, the outer leg portion 13 extends from the outer end of the bridge portion 6 radially inward of the disk 1. Inverted U-shaped recesses 14 are provided in the distal end portion of the outer leg portion 13. The recesses 14 are spaced apart from each other in the circumferential direction of the disk 1.

The recesses 14 are formed as cut portions for machining the corresponding cylinder bores 7A. The recesses 14 are disposed in bilateral symmetry with respect to the center line O1—O1 so as to coincide with the centers P and Q of the cylinder bores 7A. The outer leg portion 13 has claw portions 13A, 13B and 13C defined by trifurcated portions thereof that are bounded by the recesses 14.

The claw portions 13A, 13B and 13C are also disposed substantially in bilateral symmetry with respect to the center line O1—O1 as in the case of the bridge portion 6 and the cylinder bores 7A. Consequently, the claw portions 13A, 13B and 13C as a whole are displaced relative to the center line O2—O2 toward the exit side of the disk brake with respect to the rotational direction of the disk 1.

As shown in FIG. 1, of the claw portions 13A, 13B and 13C, the entrance-side claw portion 13C and the exit-side claw portion 13A as viewed in the rotational direction of the disk 1 have approximately the same wall thickness d in the circumferential direction of the disk 1. The outer leg portion 13 has a side portion 13E on the entrance side in the rotational direction of the disk 1 and a side portion 13D on the exit side. The entrance side portion 13E is diagonally cut toward the claw portion 13C from the bridge portion 6 so as to have a larger area than the exit side portion 13D. It should be noted that the claw portion 13B has a greater wall thickness in the circumferential direction of the disk 1 than the wall thickness d.

As shown in FIG. 3, pistons 15 (only one of which is illustrated) are slidably fitted in the respective cylinder bores 7A of the caliper 5. Each piston 15 is formed in the shape of a cylinder, one end of which is closed. The pistons 15 are slidably displaced axially in the respective cylinder bores 7A by the pressure of a brake fluid externally supplied into the cylinder bores 7A. This causes the friction pads 16 and 20 to be pressed against both sides of the disk 1 in cooperation with the claw portions 13A to 13C of the outer leg portion 13.

As shown in FIGS. 2 and 3, the friction pad 16 is disposed at the inner side of the disk 1. The friction pad 16 is in the shape of a flat plate. A backing plate 17 is overlaid on the back of the friction pad 16 and rigidly secured thereto. As shown in FIG. 4, the backing plate 17 has lug portions 17A (only one of which is illustrated) projecting from both longitudinal ends of the backing plate 17. The lug portions 17A are slidably supported by the respective pad guide portions 2A1 of the mounting member 2. Thus, the friction pad 16 is pressed against the disk 1 by the caliper 5 to apply braking force to the disk 1.

A shim plate 18 is mounted on the back of the backing plate 17. The shim plate 18 is made from an anti-corrosive metal plate, e.g. a stainless steel plate. Another shim plate 19 is disposed between the shim plate 18 and the pistons 15. When the brake is activated, the shim plate 19 makes the surface pressure applied to the friction pad 16 from the pistons 15 uniform, thereby preventing deterioration of the shim plate 18. The shim plate 19 is coated with a rubber or other similar material to reduce brake noise.

The outer friction pad 20 has almost the same arrangement as the inner friction pad 16. That is, the friction pad 20 has a backing plate 21. As shown in FIG. 1, the backing plate 21 has lug portions 21A (only one of which is illustrated) slidably supported by the respective pad guide portions 2A1 of the mounting member 2. Thus, the friction pad 20 is pressed against the disk 1 by the caliper to apply braking force to the disk 1 in cooperation with the friction pad 16.

An inner shim plate 22 is a first shim plate provided on the back of the backing plate 21. The inner shim plate 22 is formed by coating both sides of a steel plate (not shown) with a material that has a relatively large coefficient of friction and is softer than the backing plate 21, e.g. a hard rubber material. As shown in FIG. 1, the inner shim plate 22 has securing claw portions 22A. The securing claw portions 22A are engaged with the peripheral edge of the backing plate 21. Thus, the inner shim plate 22 is secured to the back of the backing plate 21, and displacement of the inner shim plate 22 relative to the friction pad 20 is restricted.

An outer shim plate 23 is a second shim plate provided at the back of the friction pad 20 with the inner shim plate 22 interposed therebetween. As shown in FIG. 1, the outer shim plate 23 is formed to have a contour approximately similar to that of the inner shim plate 22 from an anticorrosive metal plate, e.g. a stainless steel plate. The outer side of the outer shim plate 23 abuts on the claw portions 13A to 13C of the caliper 5.

The area between the outer shim plate 23 and the inner shim plate 22 is supplied with a lubricant, e.g. grease, so that the coefficient of friction between the outer shim plate 23 and the inner shim plate 22 is smaller than the coefficient of friction between the outer shim plate 23 and the claw portions 13A to 13C. Consequently, the outer shim plate 23 slidably contacts the inner shim plate 22, and displacement of the outer shim plate 23 relative to the claw portions 13A to 13C is restricted.

The outer shim plate 23 has guide claw portions 23A. The guide claw portions 23A are guided relative to the backing plate 21 in the circumferential direction of the disk 1, thereby enabling the outer shim plate 23 to slide relative to the inner shim plate 22.

The following is a description of the operation of disk brake according to this embodiment arranged as stated above. When the brakes are applied to the vehicle, the pistons 15 provided in the cylinder bores 7A of the caliper are pressed toward the disk 1 by the pressure of an externally supplied brake fluid. This causes the friction pads 16 and 20 to be pressed against the disk 1.

Consequently, the disk 1 is strongly gripped by the friction pads 16 and 20 between the pistons 15 and the claw portions 13A to 13C of the outer leg portion 13. Thus, braking force is applied to the disk 1.

During the vehicle braking operation, braking torque from the disk 1 undesirably acts as bending moment on the caliper 5 through the friction pads 16 and 20 in the direction of the arrow M shown in FIG. 2. Accordingly, of the two friction pads 16 and 20, the friction pad 16 is likely to show such a tendency that the surface pressure applied to the disk 1 is relatively high at the entrance side in the rotational direction (indicated by the arrow A) of the disk 1 and relatively low at the exit side.

However, the pistons 15, together with the cylinder bores 7A of the caliper 5, are decentered toward the exit side in the rotational direction of the disk 1. Therefore, the surface pressure of the inner friction pad 16 applied to the disk 1 can be reduced at the entrance side in the rotational direction of the disk 1. Thus, non-uniform wear of the friction pad 16 can be prevented.

Moreover, the claw portions 13A, 13B and 13C of the outer leg portion 13 are decentered toward the exit side in the rotational direction of the disk 1 so that the claw portions 13A and 13C, and the claw portion 13B, are disposed substantially in bilateral symmetry with respect to the center line O1—O1 between the cylinder bores 7A. Accordingly, when the pistons 15 press the inner friction pad 16 during the braking operation, the outer friction pad can be pressed by the claw portions 13A to 13C at positions corresponding to the pistons 15.

Furthermore, of the claw portions 13A, 13B and 13C, the claw portions 13A and 13C have approximately the same wall thickness in the circumferential direction of the disk 1. Therefore, the rigidities of the claw portions 13A and 13C can be made substantially equal to each other. Because the claw portion 13B is also approximately in bilateral symmetry with respect to the center line O1—O1, the rigidity of the claw portion 13B can be made substantially the same at both sides of the center line O1—O1, i.e. the entrance and exit sides in the rotational direction of the disk 1.

Furthermore, the bridge portion 6, together with the cylinder bores 7A and the outer leg portion 13, is decentered by a dimension δ with respect to the center line O2—O2 of the friction pads 16 and 20 so that the bridge portion 6 is approximately in bilateral symmetry with respect to the center line O1—O1. Therefore, the rigidity of the bridge portion 6 can also be made substantially the same at both sides of the center line O1—O1, i.e. the entrance and exit sides in the rotational direction of the disk 1. Consequently, the rigidities of the claw portions 13A and 13C, which are integral with the bridge portion 6, can be set approximately equal to each other. Thus, the outer friction pad 20 can be prevented from tilting relative to the disk 1 through the outer leg portion 13, which would otherwise occur owing to the difference in rigidity between the claw portions 13A and 13C during the braking operation.

Furthermore, the outer shim plate 23 is placed in slidable contact with the inner shim plate 22 secured to the backing plate 21 of the friction pad 20, and the coefficient of friction between the outer shim plate 23 and the inner shim plate 22 is set smaller than that between the outer shim plate 23 and the claw portions 13A to 13C. Accordingly, when the friction pad 20 is displaced circumferentially by being dragged by rotational force from the disk 1 during the braking operation, the inner shim plate 22 slides relative to the outer shim plate 23. This makes it possible to relieve a part of bending moment from the disk 1 that acts in the direction of the arrow M shown in FIG. 2.

Consequently, it is possible to reduce the bending moment acting on the outer leg portion 13 through the friction pad 20 and hence possible to suppress tilting of the whole caliper 5 in the direction of the arrow M relative to the mounting member 2 through the sliding pins 11 and 12. This also makes it possible to suppress tilting of the outer friction pad 20 relative to the disk 1 through the outer leg portion 13.

Accordingly, this embodiment enables the surface pressure of the claw portions 13A to 13C applied to press the friction pad 20 during the braking operation to be kept uniform. Thus, non-uniform wear of the outer friction pad 20, as well as the inner friction pad 16, can be suppressed. Consequently, the lifetime of the friction pad 20 can be increased, and it is possible to prevent the occurrence of brake noise, judder and so forth during the braking operation.

Although in the foregoing embodiment the caliper 5 is provided with two cylinder bores 7A, the present invention is not necessarily limited to the described arrangement. The caliper 5 may be provided with only one cylinder bore 7A or three or more cylinder bores 7A. In this case also, the single cylinder bore 7A or the three or more cylinder bores 7A are decentered toward the exit side in the rotational direction of the disk 1 with respect to the friction pads 16 and 20. By doing so, advantageous effects similar to those of the above-described embodiment can be obtained.

Although in the foregoing embodiment the outer friction pad 20 is provided with the inner shim plate 22 and the outer shim plate 23, the present invention is not necessarily limited to the described arrangement. For example, the inner friction pad 16 may also be provided with an inner shim plate 22 and an outer shim plate 23 in almost the same way as in the case of the outer friction pad 20.

Although in the foregoing embodiment the disk brake is applied to vehicles, for example, an automobile, the present invention is not necessarily limited thereto. For example, the present invention may also be applied to brake systems other than those used in vehicles.

As has been detailed above, according to the present invention, the cylinder bore of the caliper is decentered toward the exit side in the rotational direction of the disk with respect to the friction pads, and the claw portions of the caliper are also decentered toward the exit side in the rotational direction of the disk with respect to the friction pads. Of the claw portions, those which are provided at the entrance and exit sides, respectively, in the rotational direction of the disk have approximately the same wall thickness in the circumferential direction of the disk. Accordingly, when the brake is activated, the claw portions can exhibit approximately the same rigidity. Consequently, the surface pressure of each claw portion pressing the outer friction pad can be kept uniform. Accordingly, it is possible to suppress non-uniform wear of the outer friction pad as well as the inner friction pad. Thus, the lifetime of the outer friction pad can be increased, and it is possible to prevent the occurrence of brake noise, judder and so forth during the braking operation.

In a case where the caliper is disposed on the side of the forward end of the vehicle with respect to the axle, the caliper is suspended by a pin provided at the entrance side of the caliper (i.e. the upper side of the vehicle). In this case, because the mass of the entrance portion of the caliper decreases, the center of gravity of the caliper lowers toward the lower side of the vehicle (i.e. the exit side of the caliper). Therefore, stability improves, and it is possible to reduce dragging when the vehicle is running under non-braking conditions.

According to one embodiment, the bridge portion of the caliper is decentered toward the exit side in the rotational direction of the disk with respect to the friction pads. With this arrangement, the rigidity of the bridge portion can be made substantially the same at the entrance and exit sides in the rotational direction of the disk. Consequently, the rigidities of the claw portions, which are integral with the bridge portion, can be set equal to each other even more accurately. Accordingly, non-uniform wear of the outer friction pad can be surely prevented during the braking operation.

According to another embodiment, a first shim plate is attached to the back of a friction pad, and a second shim plate is placed in slidable contact with the first shim plate, and the coefficient of friction between the first and second shim plates is set smaller than that between the second shim plate and the caliper. With this arrangement, when the brake is activated, the first shim plate, which is integral with the friction pad, is allowed to slide relative to the second shim plate, which is provided on the caliper side. Thus, it is possible to reduce rotational force from the disk that acts on the outer leg portion through the friction pad. Consequently, it is possible to suppress tilting of the friction pad, together with the caliper, with respect to the disk. Thus, non-uniform wear of the friction pad can be prevented even more effectively.

What is claimed is:

1. A disk brake comprising:
  a caliper including a bridge portion to extend over an outer periphery of a disk, a cylinder bore having a central axis and being formed at a side of said bridge portion, and an outer leg portion formed at a side of said bridge portion opposite said cylinder bore, said outer leg portion having at least a pair of claw portions arranged on opposite sides of said central axis of said cylinder bore;
  a mounting member supporting said caliper such that said caliper can move in a direction of an axis of rotation of the disk; and
  a pair of friction pads including an inner pad and an outer pad, said pair of friction pads being arranged to extend in a circumferential direction of the disk and being positioned at respective locations on either side of the disk, said pair of friction pads being supported by said mounting member such that said pair of friction pads can move in said direction of said axis of rotation of the disk, said pair of friction pads being arranged to be pressed against both sides of the disk by said caliper;

wherein said cylinder bore and said outer leg portion of said caliper are positioned so as to be decentered toward an exit side of said disk brake with respect to said pair of friction pads, and wherein an entrance-side claw portion of said at least a pair of claw portions and an exit-side claw portion of said at least a pair of claw portions have approximately equal wall thicknesses with respect to a circumferential direction of the disk.

2. The disk brake of claim 1, wherein said bridge portion of said caliper is positioned so as to be decentered toward said exit side of said disk brake with respect to said pair of friction pads.

3. The disk brake of claim 2, wherein at least one of said pair of friction pads includes a first shim plate and a second shim plate between said caliper and said at least one of said pair of friction pads, said first shim plate contacting a back surface of said at least one of said pair of friction pads such that displacement of said first shim plate relative to said at least one of said pair of friction pads is restricted, said second shim plate having a first side surface contacting said caliper and a second side surface contacting said first shim plate, said second side surface of said second shim plate having a coefficient of friction smaller than a coefficient of friction of said first side surface of said second shim plate so that said second shim plate is capable of sliding relative to said first shim plate in a circumferential direction of the disk.

4. The disk brake of claim 1, wherein a midpoint between said entrance-side claw portion and said exit-side claw portion coincides with said central axis of said cylinder bore.

5. The disk brake of claim 1, wherein at least one of said pair of friction pads includes a first shim plate and a second shim plate between said caliper and said at least one of said pair of friction pads, said first shim plate contacting a back surface of said at least one of said pair of friction pads such that displacement of said first shim plate relative to said at least one of said pair of friction pads is restricted, said second shim plate having a first side surface contacting said caliper and a second side surface contacting said first shim plate, said second side surface of said second shim plate having a coefficient of friction smaller than a coefficient of friction of said first side surface of said second shim plate so that said second shim plate is capable of sliding relative to said first shim plate in a circumferential direction of the disk.

6. The disk brake of claim 1, wherein said at least a pair of claw portions define U-shaped recesses therebetween.

7. A disk brake comprising:

a caliper including a bridge portion to extend over an outer periphery of a disk, a plurality of cylinder bores being formed at a side of said bridge portion, and an outer leg portion formed at a side of said bridge portion opposite said cylinder bores, each of said cylinder bores having a central axis, said outer leg portion having a plurality of claw portions, wherein adjacent pairs of said claw portions are arranged on opposite sides of said central axis of each of said cylinder bores;

a mounting member supporting said caliper such that said caliper can move in a direction of an axis of rotation of the disk; and a pair of friction pads including an inner pad and an outer pad, said pair of friction pads being arranged to extend in a circumferential direction of the disk and being positioned at respective locations on either side of the disk, said pair of friction pads being supported by said mounting member such that said pair of friction pads can move in said direction of an axis of rotation of the disk, said pair of friction pads being arranged to be pressed against both sides of the disk by said caliper;

wherein said cylinder bores are arranged so as to be bilaterally symmetrical with respect to an axis of symmetry, said axis of symmetry and said outer leg portion of said caliper are positioned so as to be decentered toward an exit side of the disk brake with respect to said pair of fiction pads, and wherein an entrance-side claw portion of said plurality of claw portions and an exit-side claw portion of said plurality of claw portions have approximately equal wall thicknesses with respect to a circumferential direction of the disk.

8. The disk brake of claim 7, wherein said bridge portion of said caliper is positioned so as to be decentered toward said exit side of said disk brake with respect to said pair of friction pads.

9. The disk brake of claim 8, wherein at least one of said pair of friction pads includes a first shim plate and a second shim plate between said caliper and said at least one of said pair of friction pads, said first shim plate contacting a back surface of said at least one of said pair of friction pads such that displacement of said first shim plate relative to said at least one of said pair of friction pads is restricted, said second shim plate having a first side surface contacting said caliper and a second side surface contacting said first shim plate, said second side surface of said second shim plate having a coefficient of friction smaller than a coefficient of friction of said first side surface of said second shim plate so that said second shim plate is capable of sliding relative to said first shim plate in a circumferential direction of the disk.

10. The disk brake of claim 7, wherein a midpoint between said entrance-side claw portion and said exit-side claw portion coincides with said axis of symmetry of said cylinder bores.

11. The disk brake of claim 7, wherein at least one of said pair of friction pads includes a first shim plate and a second shim plate between said caliper and said at least one of said pair of friction pads, said first shim plate contacting a back surface of said at least one of said pair of friction pads such that displacement of said first shim plate relative to said at least one of said pair of friction pads is restricted, said second shim plate having a first side surface contacting said caliper and a second side surface contacting said first shim plate, said second side surface of said second shim plate having a coefficient of friction smaller than a coefficient of friction of said first side surface of said second shim plate so that said second shim plate is capable of sliding relative to said first shim plate in a circumferential direction of the disk.

12. The disk brake of claim 7, wherein said plurality of claw portions define U-shaped recesses therebetween.

* * * * *